US011867088B2

(12) United States Patent
Yokoyama et al.

(10) Patent No.: US 11,867,088 B2

(45) Date of Patent: Jan. 9, 2024

(54) TURBINE BLADE AND TURBINE

(71) Applicant: MITSUBISHI HEAVY INDUSTRIES, LTD., Tokyo (JP)

(72) Inventors: Takashi Yokoyama, Tokyo (JP); Toshihiro Takeda, Tokyo (JP); Toshifumi Kanno, Tokyo (JP); Hikaru Kurosaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/795,718

(22) PCT Filed: Feb. 10, 2021

(86) PCT No.: PCT/JP2021/004929

§ 371 (c)(1),
(2) Date: Jul. 27, 2022

(87) PCT Pub. No.: WO2021/166757

PCT Pub. Date: Aug. 26, 2021

(65) Prior Publication Data

US 2023/0102240 A1 Mar. 30, 2023

(30) Foreign Application Priority Data

Feb. 19, 2020 (JP) ................................ 2020-026624

(51) Int. Cl.
*F01D 5/30* (2006.01)

(52) U.S. Cl.
CPC ...... *F01D 5/3007* (2013.01); *F05D 2250/712* (2013.01); *F05D 2260/941* (2013.01)

(58) Field of Classification Search
CPC ............. F01D 5/3007; F05D 2250/712; F05D 2260/941; F04D 29/322
See application file for complete search history.

(56) References Cited

U.S. PATENT DOCUMENTS 5,135,354 A * 8/1992 Novotny ................. F01D 5/081 416/193 A
5,435,694 A * 7/1995 Kray ..................... F01D 5/3007 416/239
9,353,629 B2 5/2016 Faulder
(Continued)

FOREIGN PATENT DOCUMENTS

JP 2004-116364 A 4/2004

*Primary Examiner* — Courtney D Heinle
*Assistant Examiner* — Ryan C Clark
(74) *Attorney, Agent, or Firm* — Osha Bergman Watanabe & Burton LLP

(57) ABSTRACT

A turbine blade includes: a platform; an airfoil portion extending from the platform in a blade height direction and having a pressure surface and a suction surface extending between a leading edge and a trailing edge; a blade root portion disposed on opposite side of the airfoil portion across the platform in the blade height direction and having a bearing surface; and a shank disposed between the platform and the blade root portion. The shank has: a first lateral surface having a first recess portion and disposed on a pressure surface side and along an extension direction of the blade root portion; and a second lateral surface having a second recess portion and disposed on a suction surface side and along the extension direction of the blade root portion.

12 Claims, 8 Drawing Sheets

(56) References Cited

U.S. PATENT DOCUMENTS

| | | | | |
|---|---|---|---|---|
| 9,739,159 | B2 * | 8/2017 | Carter | F01D 5/147 |
| 11,578,603 | B2 * | 2/2023 | Fukui | F01D 5/16 |
| 2013/0224036 | A1 * | 8/2013 | Lamicq | F01D 5/3007 416/234 |
| 2014/0219806 | A1 * | 8/2014 | Hirata | F01D 5/3007 416/219 R |
| 2015/0098832 | A1 * | 4/2015 | Carter | F01D 5/3007 416/223 R |
| 2016/0032739 | A1 * | 2/2016 | Sekihara | F02C 3/04 415/208.1 |
| 2018/0156046 | A1 * | 6/2018 | Ahmad | F01D 5/147 |

* cited by examiner

TURBINE BLADE AND TURBINE

TECHNICAL FIELD

The present disclosure relates to turbine blades and turbines.

BACKGROUND

A blade root portion of a turbine blade used for a turbine is a portion where centrifugal stress due to the centrifugal load transmitted from an airfoil portion and thermal stress due to the temperature difference from the platform repeatedly act, and is a stress concentration portion. For this reason, in order to suppress a decrease in the fatigue life of the turbine blade, measures have been taken to reduce the stress at the blade root portion.

Patent Document 1 discloses a turbine blade in which a thinned portion (pocket) is provided in a neck portion (shank) disposed between a platform on which an airfoil portion is provided and a blade root portion. Further, Patent Document 1 describes that a fillet portion whose curvature changes is provided in the thinned portion in order to reduce the stress acting on the blade root portion.

CITATION LIST

Patent Literature

Patent Document 1: US9353629B

SUMMARY

Technical Problem

By the way, a stress distribution occurs in the blade root portion of the turbine blade, and for example, the stress may be relatively large in the central portion of the blade root portion in the extension direction (or the front-rear direction (turbine axial direction)). Therefore, it is desired to effectively equalize the stress distribution in the blade root portion and suppress the decrease in the fatigue life of the turbine blade.

In view of the above circumstances, an object of at least one embodiment of the present invention is to provide a turbine blade and a turbine capable of effectively equalizing the stress distribution in a blade root portion.

Solution to Problem

A turbine blade according to at least one embodiment of the present invention includes: a platform; an airfoil portion extending from the platform in a blade height direction and having a pressure surface and a suction surface extending between a leading edge and a trailing edge; a blade root portion disposed on opposite side of the airfoil portion across the platform in the blade height direction and having a bearing surface; and a shank disposed between the platform and the blade root portion, wherein the shank has: a first lateral surface having a first recess portion and disposed on a pressure surface side and along an extension direction of the blade root portion; and a second lateral surface having a second recess portion and disposed on a suction surface side and along the extension direction of the blade root portion, wherein in a cross-section of the shank orthogonal to the blade height direction, the first recess portion and the second recess portion include a central position of the shank in the extension direction of the blade root portion, and a formation length of the first recess portion along the extension direction of the blade root portion is larger than a formation length of the second recess portion along the extension direction of the blade root portion.

Further, a turbine according to at least one embodiment of the present invention includes the above-mentioned turbine blade and a rotor disk having a blade groove that engages with the blade root portion of the turbine blade.

Advantageous Effects

According to at least one embodiment of the present invention, there is provided a turbine blade and a turbine capable of effectively equalizing the stress distribution in a blade root portion.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Configuration of Gas Turbine

Figure 1:
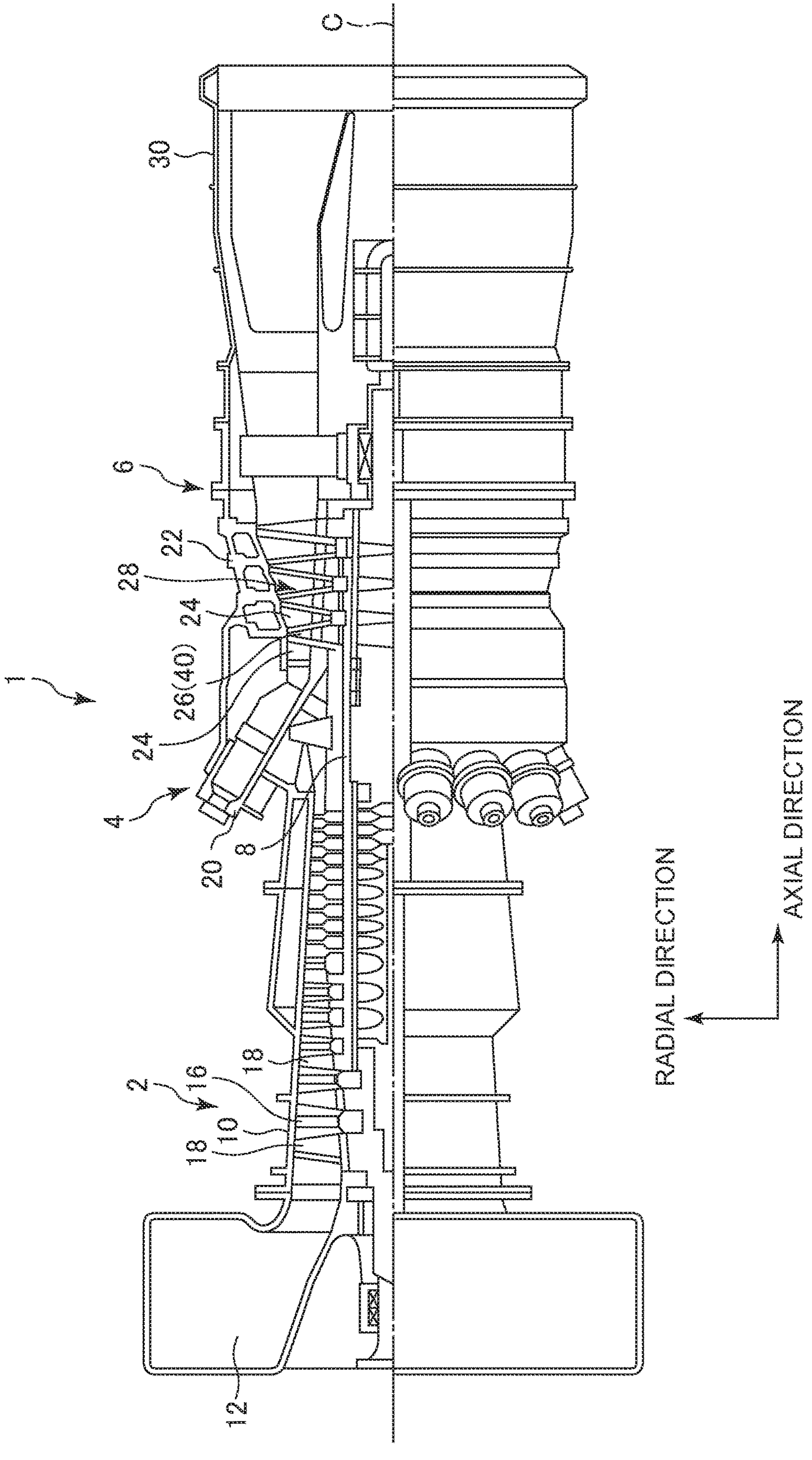
FIG. 1 is a schematic configuration diagram of a gas turbine according to an embodiment.

First, a gas turbine to which a turbine blade according to some embodiments is applied will be described with reference to FIG. 1. FIG. 1 is a schematic configuration diagram of a gas turbine according to an embodiment. As shown in FIG. 1, a gas turbine 1 includes a compressor 2 for generating compressed air, a combustor 4 for generating combustion gas using compressed air and fuel, and a turbine 6 configured to be rotationally driven by the combustion gas. In the case of the gas turbine 1 for power generation, a generator (not shown) is connected to the turbine 6.

The compressor 2 includes a plurality of stator blades 16 fixed to a compressor casing 10 side, and a plurality of rotor blades 18 planted in a rotor 8 so as to be alternately arranged with respect to the stator blades 16. Air taken in from an air intake port 12 is sent to the compressor 2, and this air passes through the plurality of stator blades 16 and the plurality of rotor blades 18 and is compressed to become high-temperature and high-pressure compressed air.

Fuel and the compressed air generated by the compressor 2 are supplied to the combustor 4, and the fuel is burned in the combustor 4 to generate combustion gas which is an operating fluid of the turbine 6. As shown in FIG. 1, the gas turbine 1 has a plurality of combustors 4 arranged in the casing 20 along the circumferential direction around with the rotor 8 (rotor axis C).

The turbine 6 has a combustion gas passage 28 formed by a turbine casing 22, and includes a plurality of stator blades 24 and rotor blades 26 provided in a combustion gas passage 28. The stator blade 24 is fixed to the turbine casing 22 side, and the plurality of stator blades 24 arranged along the circumferential direction of the rotor 8 form a stator blade row. The rotor blades 26 are planted in the rotor 8, and the plurality of rotor blades 26 arranged along the circumferential direction of the rotor 8 form a rotor blade row. The stator blade row and the rotor blade row are arranged alternately in the axial direction of the rotor 8.

In the turbine 6, the combustion gas flowing from the combustor 4 into the combustion gas passage 28 passes through the plurality of stator blades 24 and the plurality of rotor blades 26, whereby the rotor 8 is rotationally driven around a rotor axis C. In this way, the generator connected to the rotor 8 is driven to generate electric power. The combustion gas after driving the turbine 6 is discharged to the outside through an exhaust chamber 30.

Configuration of Turbine Blade

Next, a turbine blade according to some embodiments will be described. In the following description, the rotor blade 26 (see FIG. 1) of the turbine 6 of the gas turbine 1 will be described as the turbine blade 40 according to some embodiments. However, in other embodiments, the turbine blade may be the stator blade 24 (see FIG. 1) of the turbine 6 of the gas turbine 1, or the rotor blade or the stator blade of a steam turbine.

Figure 2:
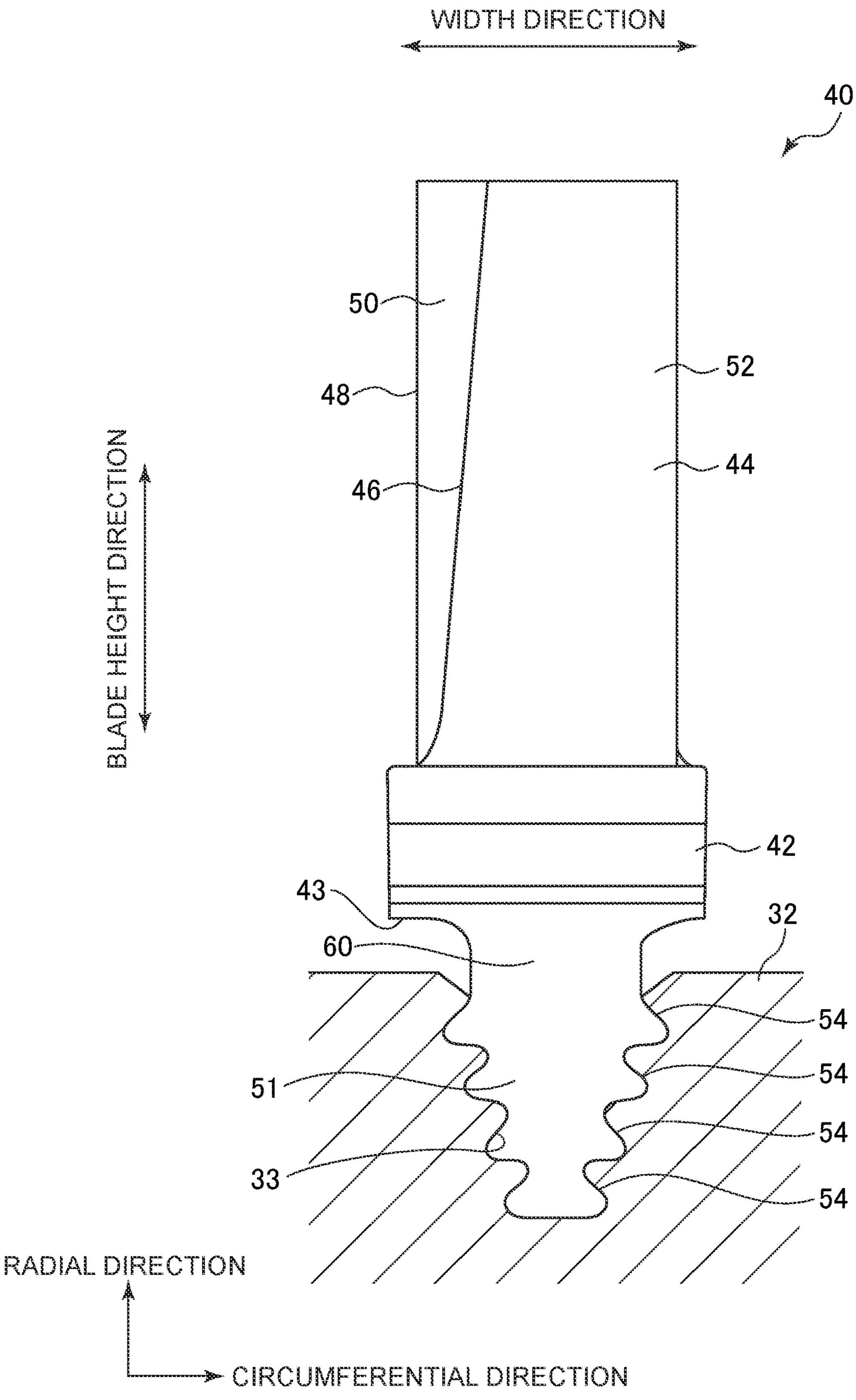
FIG. 2 is a view of a turbine blade according to an embodiment viewed in a direction from a leading edge to a trailing edge.
Figure 3:
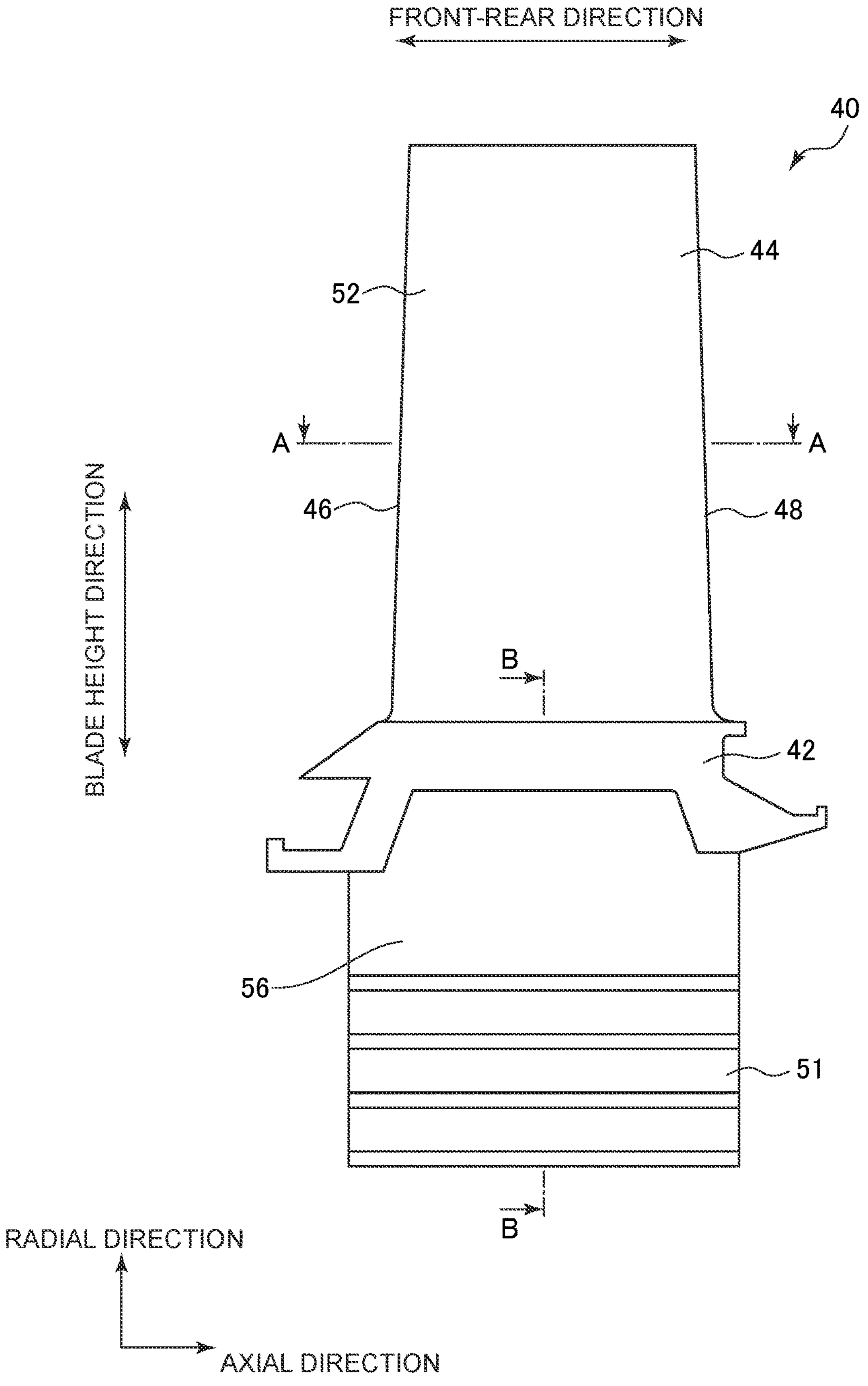
FIG. 3 is a view of the turbine blade shown in FIG. 2 viewed in a direction from a suction surface to a pressure surface.
Figure 4:
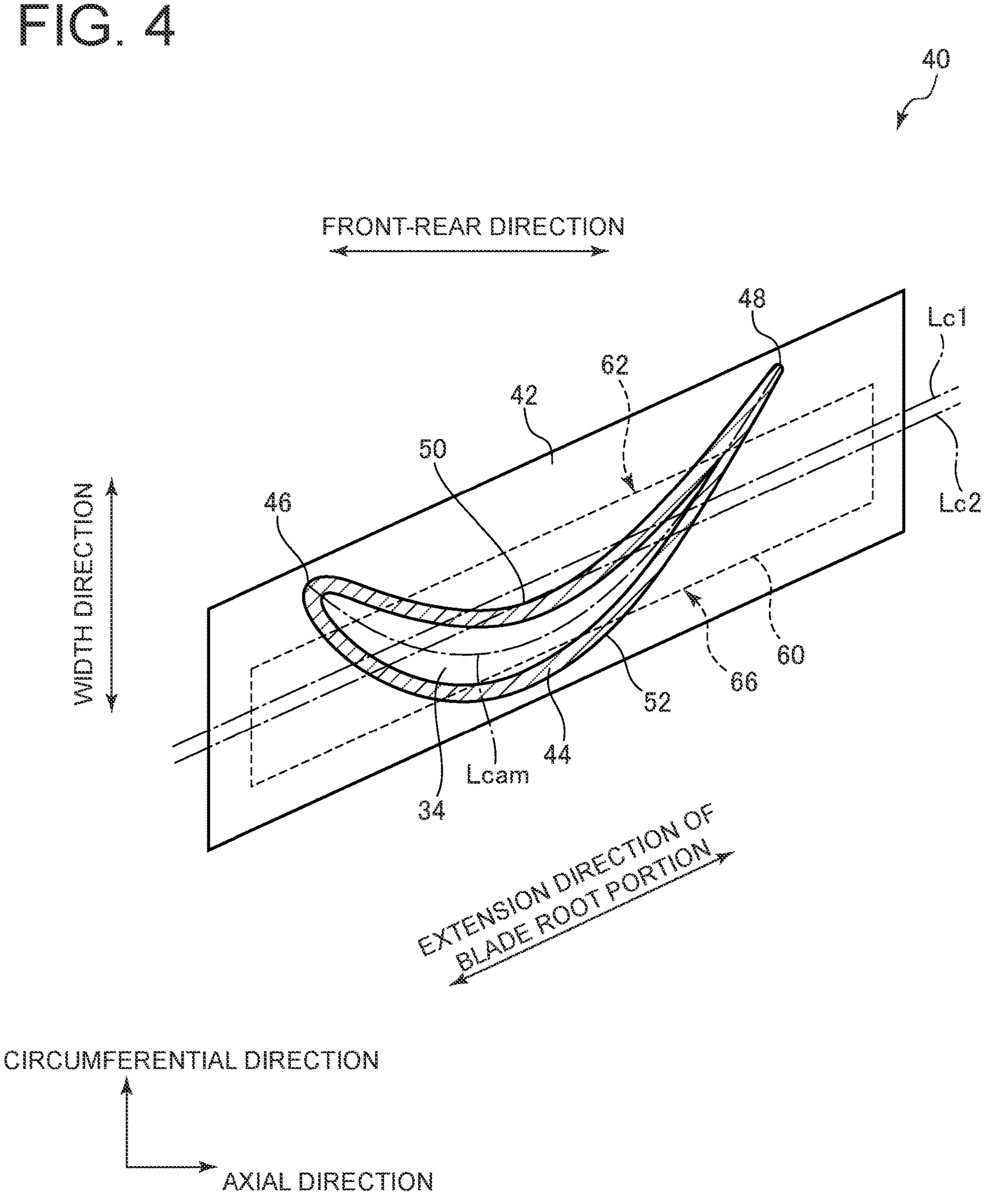
FIG. 4 is a diagram showing a cross-section taken along the line A-A of FIG. 3.

FIG. 2 is a view of the turbine blade 40 according to the embodiment as viewed in a direction (cord direction) from a leading edge to a trailing edge, FIG. 3 is a view of the turbine blade 40 shown in FIG. 2 viewed in a direction (rotor circumferential direction) from a suction surface to a pressure surface, FIG. 4 is a diagram showing a cross-section taken along the line A-A of FIG. 3. Note that FIG. 2 shows the turbine blade 40 together with the rotor disk 32 of the turbine 6.

As shown in FIGS. 2 to 4, the turbine blade 40 (rotor blade 26) according to the embodiment includes a platform 42, an airfoil portion 44 and a blade root portion 51 disposed on opposite sides with the platform 42 interposed therebetween in a blade height direction (also referred to as a span direction), and a shank 60 disposed between the platform 42 and the blade root portion 51. The airfoil portion 44, the platform 42, the blade root portion 51, and the shank 60 may be integrally configured by casting or the like.

The airfoil portion 44 is provided so as to extend in the blade height direction with respect to the rotor 8. The airfoil portion 44 has a leading edge 46 and a trailing edge 48 extending along the blade height direction, and has a pressure surface 50 and a suction surface 52 extending between the leading edge 46 and the trailing edge 48. As shown in FIG. 4, a hollow portion 34 may be formed inside the airfoil portion 44. The hollow portion 34 may function as a cooling passage through which a cooling fluid for cooling the airfoil portion 44 flows.

As shown in FIG. 2, in the turbine 6, the blade root portion 51 is engaged with a blade groove 33 provided in the rotor disk 32 that rotates together with the rotor 8. In this way, the turbine blade 40 is planted in the rotor 8 (see FIG. 1) of the turbine 6 and rotates together with the rotor 8 around the rotor axis C. The blade root portion 51 has a bearing surface 54. The bearing surface 54 is a portion of the surface of the blade root portion 51 that comes into contact with the surface of the blade groove 33 of the rotor disk 32 when the rotor 8 rotates and centrifugal force acts on the turbine blade 40. That is, the bearing surface 54 is a surface facing in the direction from the blade root portion 51 toward the airfoil portion 44 (that is, a surface facing the radially outer side of the rotor 8) in the blade height direction.

As shown in FIG. 4, the blade root portion 51 may extend so as to be inclined with respect to the axial direction (direction of the rotor axis C) of the turbine 6. That is, the blade root portion 51 of the turbine blade 40 may be inserted into the blade groove 33 provided in the rotor disk 32 so as to be inclined with respect to the axial direction of the turbine 6. A straight line Lc1 in the figure is the center line of the platform 42, and a straight line Lc2 is the center line of the shank 60.

Figure 5:
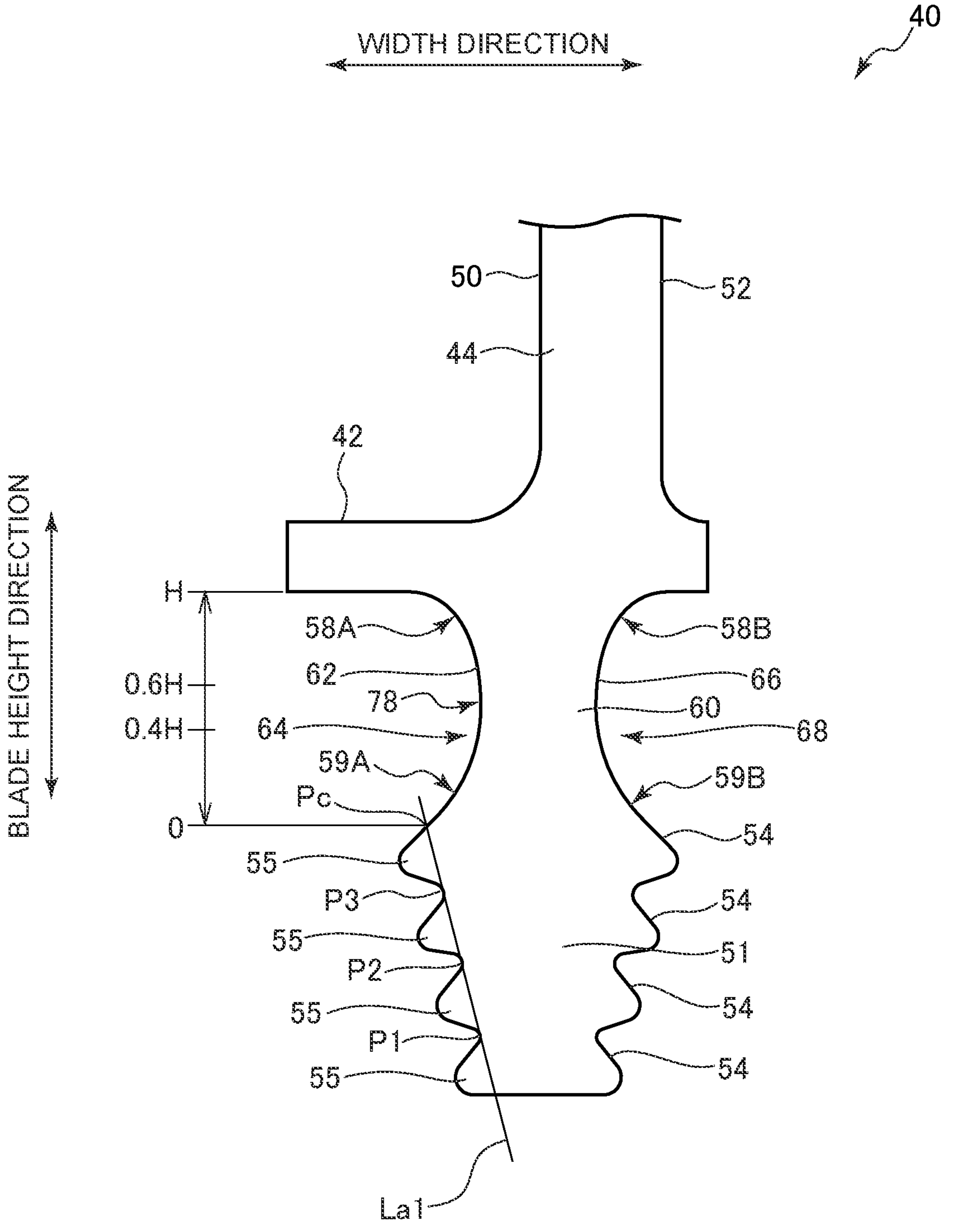
FIG. 5 is a diagram showing a cross-section taken along the line B-B of FIG. 3.
Figure 6:
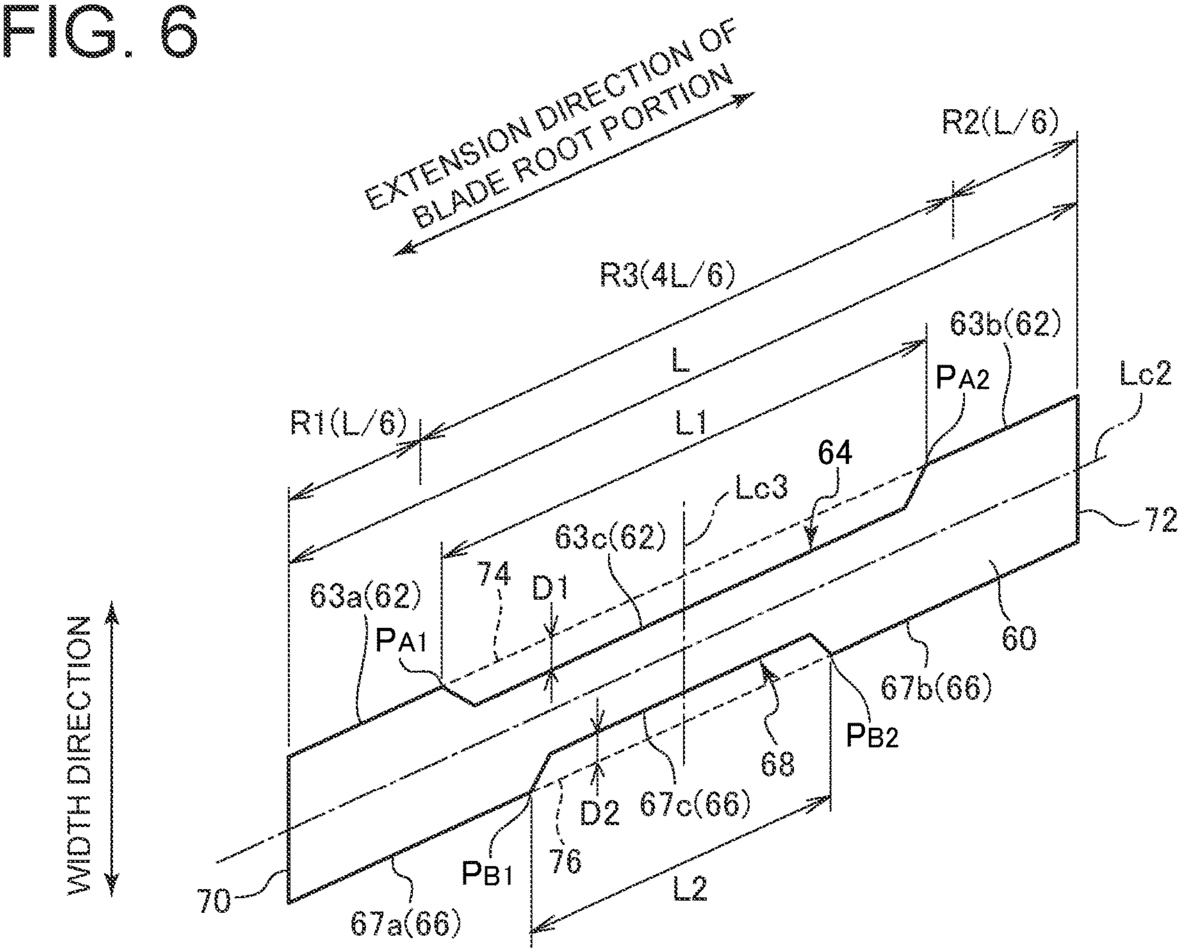
FIG. 6 is a diagram showing a cross-section orthogonal to a blade height direction of a turbine blade according to an embodiment.
Figure 7:
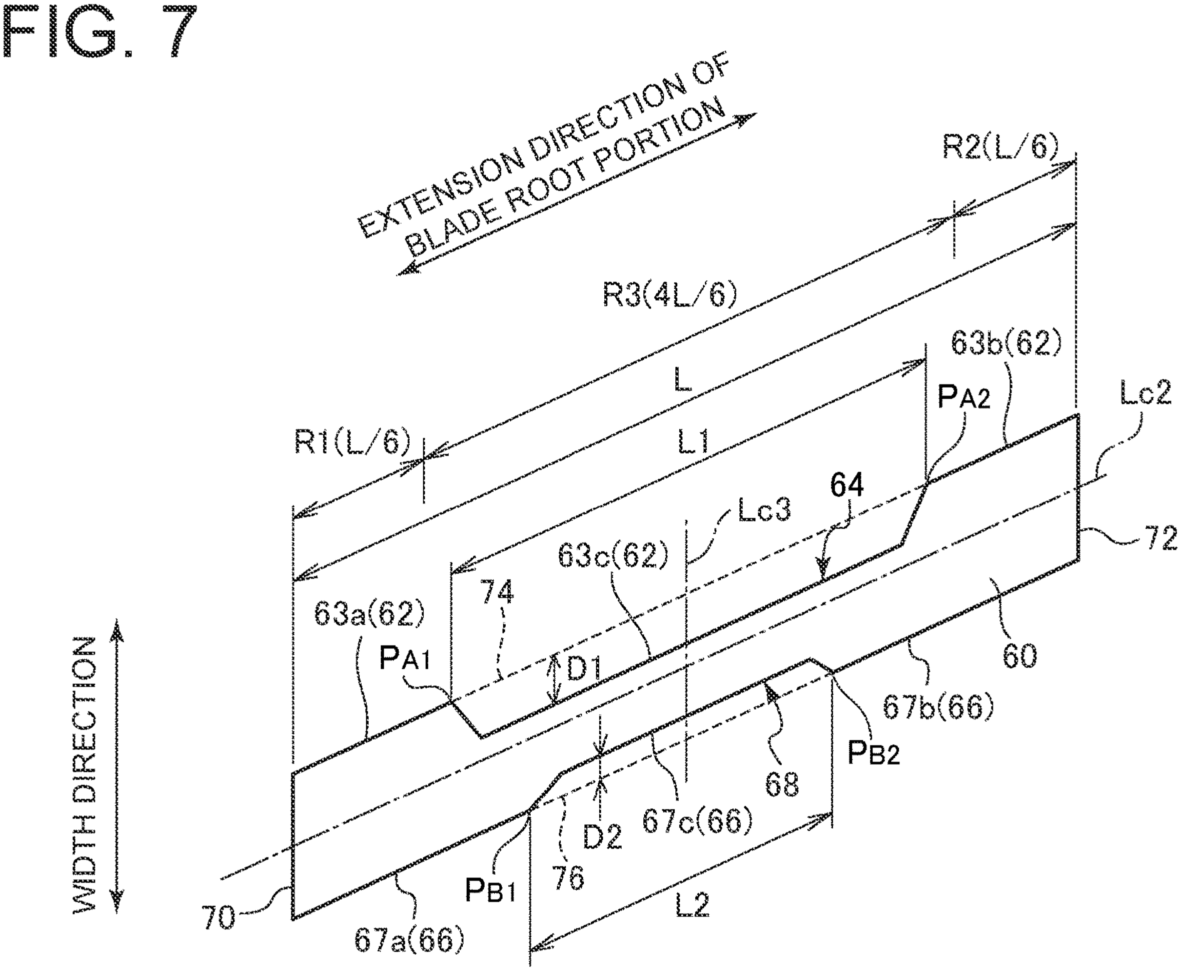
FIG. 7 is a diagram showing a cross-section orthogonal to a blade height direction of a turbine blade according to an embodiment.
Figure 8:
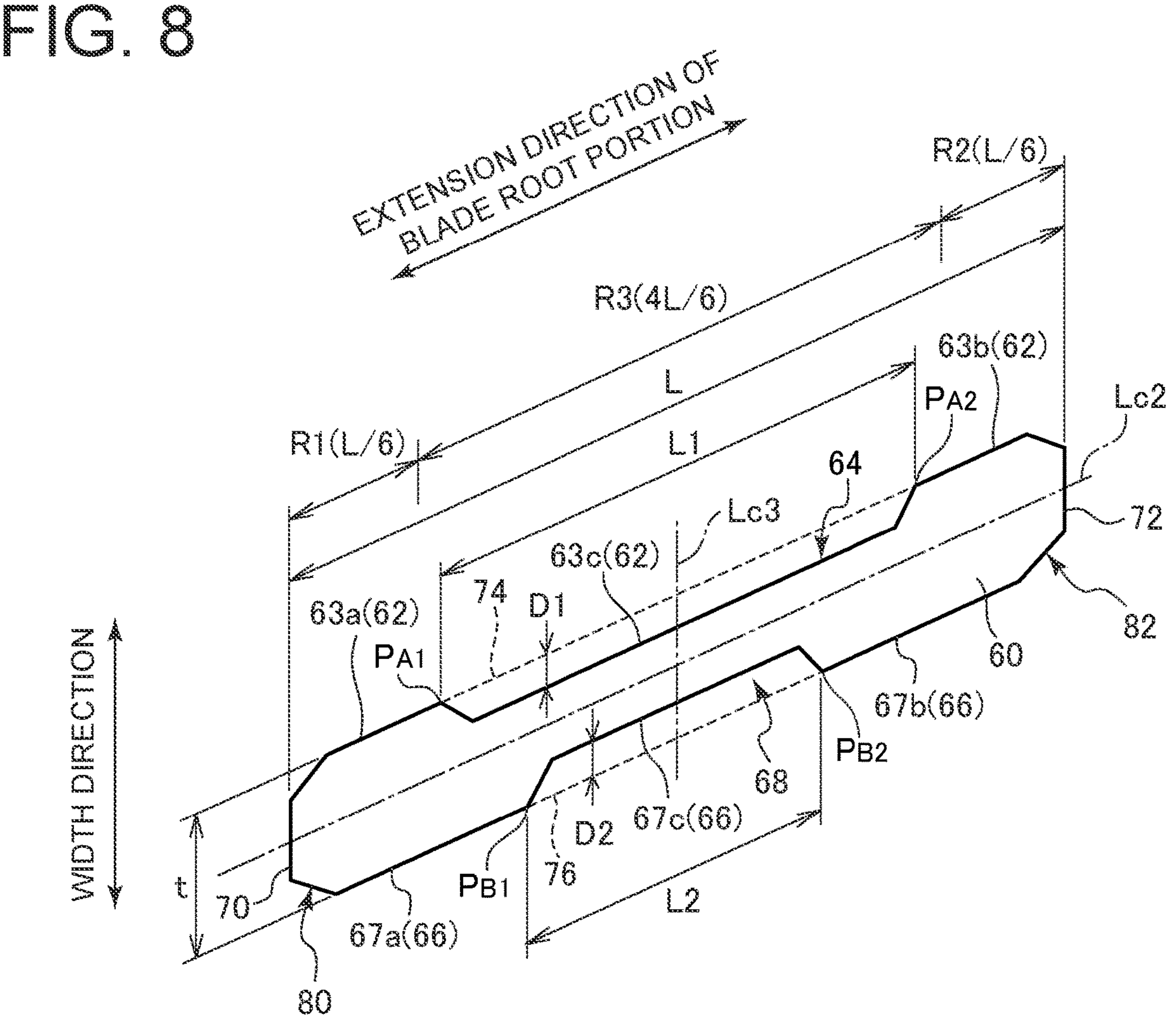
FIG. 8 is a diagram showing a cross-section orthogonal to a blade height direction of a turbine blade according to an embodiment.

FIG. 5 is a diagram showing a cross-section taken along the line B-B of FIG. 3. FIGS. 6 to 8 are diagrams showing cross-sections orthogonal to the blade height direction of the shank 60 of the turbine blade 40 according to an embodiment, respectively.

In the present specification, the "width direction" of the shank 60 refers to the direction crossing the turbine blade 40 from the pressure surface 50 side of the airfoil portion 44 to the suction surface 52 side (or from the suction surface 52 side to the pressure surface 50 side). The width direction of the shank 60 corresponds to the circumferential direction of the rotor 8.

As shown in FIGS. 5 to 8, the shank 60 of the turbine blade 40 has a first lateral surface 62 disposed on the pressure surface 50 side along the extension direction of the blade root portion 51 and a second lateral surface 66 disposed on the suction surface 52 side along the extension direction of the blade root portion 51. The shank 60 has a front end surface 70 and a rear end surface 72, and the first lateral surface 62 and the second lateral surface 66 extend along the extension direction of the blade root portion 51 between the front end surface 70 and the rear end surface 72.

The first lateral surface 62 has a first recess portion 64 recessed from the pressure surface 50 side toward the suction surface 52 side (that is, from the first lateral surface 62 side toward the second lateral surface 66 side). The second lateral surface 66 has a second recess portion 68 recessed from the suction surface 52 side toward the pressure surface 50 side (that is, from the second lateral surface 66 side toward the first lateral surface 62 side).

The first recess portion 64 and the second recess portion 68 are provided in the central region of the shank 60 in the extension direction of the blade root portion 51. That is, as shown in FIGS. 6 to 8, in the cross-section of the shank 60 orthogonal to the blade height direction, the first recess portion 64 and the second recess portion 68 are formed so as to include the center position (the position indicated by a straight line Lc3 in the figure) of the shank 60 in the extension direction of the blade root portion 51. In the above-mentioned cross-section, a formation length L1 of the first recess portion 64 along the extension direction of the blade root portion 51 is larger than a forming length L2 of the second recess portion 68 along the extension direction of the blade root portion 51.

A stress distribution occurs in the blade root portion 51 of the turbine blade 40, and for example, the stress may be relatively large in the central portion of the blade root portion 51 in the extension direction (or the front-rear direction (turbine axial direction)).

Here, the airfoil portion 44 has a curved concave shape on the pressure surface 50 and a curved convex shape on the suction surface 52. Thus, for example, as shown in FIG. 4, in the central region of the shank 60 in the extension direction (or the front-rear direction (turbine axial direction)) of the blade root portion 51, the camber of the airfoil portion 44 above the shank 60 is biased toward the second lateral surface 66 rather than the first lateral surface 62 of the shank 60. For example, in the example shown in FIG. 4, a camber line Lcam of the airfoil portion 44 protrudes toward the suction surface 52 side (that is, the second lateral surface 66 side) more than the center line Lc1 of the platform 42 and the center line Lc2 of the shank 60 in the central region of the shank 60 in the extension direction (that is, the extension direction of the shank 60) of the blade root portion 51. Therefore, the airfoil portion 44 is disposed closer to the suction surface 52 side (closer to the second lateral surface 66 side) in the central region in the extension direction of the blade root portion 51, and is disposed closer to the pressure surface 50 side (closer to the first lateral surface 62 side) in the region closer to the end portion side than the central region.

In this regard, in the above-described embodiment, in the central region of the shank 60, the second recess portion 68 on the second lateral surface 66 side (the suction surface 52 side) where the airfoil portion 44 is mainly disposed thereabove (that is, on the radially outer side of the turbine) and the load transmission from the airfoil portion 44 is relatively large is formed relatively short. In contrast, the first recess portion 64 on the first lateral surface 62 side (the pressure surface 50 side) where the airfoil portion 44 is not mainly disposed thereabove and the load transmission from the airfoil portion 44 is relatively small is formed relatively long. Therefore, the thickness of the central portion of the shank 60 (the thickness in the width direction of the shank 60) can be effectively reduced, whereby the rigidity of the central portion of the shank 60 can be effectively reduced and the load transmitted from the airfoil portion 44 to the shank 60 can be distributed to the front end side and the rear end side. Therefore, it is possible to effectively equalize the stress distribution in the blade root portion 51 and suppress a decrease in the fatigue life of the turbine blade 40.

In some embodiments, for example, as shown in FIGS. 6 to 8, on the cross-section described above, the first lateral surface 62 includes a first front contour 63*a* connected to a front end surface 70, a first rear contour 63*b* connected to a rear end surface 72, and a first recess contour 63*c* disposed between the first front contour 63*a* and the first rear contour 63*b* to form the first recess portion 64.

The first recess contour 63*c* is connected to the first front contour 63*a* at a connection point $P_{A1}$ and is connected to the first rear contour 63*b* at a connection point $P_{A2}$. The first front contour 63*a* and the first rear contour 63*b* each at least partially overlap with a linear first reference contour 74 extending along the extension direction of the blade root portion 51. The first front contour 63*a* is provided so as to overlap with the linear first reference contour 74 extending along the extension direction of the blade root portion 51 at least in a region including the connection point $P_{A1}$. The first rear contour 63*b* is provided so as to overlap with the first reference contour 74 at least in a region including the connection point $P_{A2}$. The first recess contour 63*c* is disposed on the inner side from the pressure surface 50 side with respect to the first reference contour 74. That is, the first recess contour 63*c* is disposed closer to the center line Lc2 of the shank 60 than the first reference contour 74.

In some embodiments, for example, as shown in FIGS. 6 to 8, on the above-mentioned cross-section, the second lateral surface 66 includes a second front contour 67*a* connected to the front end surface 70, a second rear contour 67*b* connected to the rear end surface 72, and a second recess contour 67*c* disposed between the second front contour 67*a* and the second rear contour 67*b* to form the second recess portion 68.

The second recess contour 67*c* is connected to the second front contour 67*a* at a connection point $P_{B1}$ and is connected to the second rear contour 67*b* at a connection point $P_{B2}$. The second front contour 67*a* and the second rear contour 67*b* each at least partially overlap with a linear second reference contour 76 extending along the extension direction of the blade root portion 51. The second front contour 67*a* is provided so as to overlap with the linear second reference contour 76 extending along the extension direction of the blade root portion 51 at least in a region including the connection point $P_{B1}$. The second rear contour 67*b* is provided so as to overlap with the second reference contour 76 at least in a region including the connection point $P_{B2}$. The second recess contour 67*c* is disposed on the inner side from the suction surface 52 side with respect to the second reference contour 76. That is, the second recess contour 67*c* is disposed closer to the center line Lc2 of the shank 60 than the second reference contour 76.

In the exemplary embodiment shown in FIGS. 6 and 7, the entire first front contour 63*a* and first rear contour 63*b* are provided so as to overlap with the first reference contour 74. In the exemplary embodiment shown in FIGS. 6 and 7, the entire second front contour 67*a* and second rear contour 67*b* are provided so as to overlap with the first reference contour 74.

In the following description, a total length of the shank 60 in the extension direction of the blade root portion 51 on the above-mentioned cross-section is defined as L. On the above-mentioned cross-section, the formation length of the first recess portion 64 in the extension direction of the blade root portion 51 is defined as L1, and the formation length of the second recess portion 68 is defined as L2 (see FIGS. 6 to 8).

In some embodiments, for example, as shown in FIGS. 6 to 8, the first recess portion 64 and the second recess portion 68 are provided in a region R1 having a length of L/6 at both ends of the shank 60 and a region R3 (the central region) of the shank 60 excluding R2 (the end region). In this case, the length of the region R3 in the extension direction of the blade root portion 51 is 4L/6(=2L/3).

According to the above-described embodiment, since the first recess portion 64 and the second recess portion 68 are provided in the central region (region R3) excluding the end regions (the regions R1 and R2) of the shank 60, the thickness of the central portion of the shank 60 can be effectively reduced. Therefore, the rigidity of the central portion of the shank 60 can be effectively reduced, the load transmitted from the airfoil portion 44 to the shank 60 can be distributed to the front end side and the rear end side, and the stress distribution in the blade root portion 51 can be effectively equalized.

In some embodiments, the formation length L1 of the first recess portion 64 is larger than L/3 and 2L/3 or less, and the formation length L2 of the second recess portion 68 is L/3 or more and less than 2L/3.

In the above-described embodiment, the formation length L1 of the first recess portion 64 is larger than L/3, and the formation length L2 of the second recess portion 68 is L/3 or more, so that the thickness of the central portion of the shank 60 can be effectively reduced. Since the formation length L1 of the first recess portion 64 is 2L/3 or less and the formation length L2 of the second recess portion 68 is less than 2L/3, the shank 60 can be provided with appropriate strength. Therefore, according to the above-described embodiment, it is possible to effectively reduce the thickness of the central portion of the shank 60 while providing the shank 60 with appropriate strength. Therefore, the rigidity of the central portion of the shank 60 can be effectively reduced, the load transmitted from the airfoil portion 44 to the shank 60 can be distributed to the front end side and the rear end side, and the stress distribution in the blade root portion 51 can be effectively equalized.

In some embodiments, on the cross-section described above, the ratio of a first average depth, which is the average of the depth D1 (see FIGS. 6 to 8) of the first recess portion 64 in the width direction of the shank 60 to a second average depth which is the average of the depth D2 (see FIGS. 6 to 8) of the second recess portion 68 in the width direction of the shank 60 is 0.9 or more and 1.1 or less. In the exemplary embodiment shown in FIGS. 6 and 8, the ratio of the first average depth to the second average depth is approximately 1.

Alternatively, in some embodiments, on the cross-section described above, the ratio of the average depth of the central portion having the length of L1/2 of the first recess portion 64 to the average depth of the central portion having the length of L2/2 of the second recess portion 68 is 0.9 or more and 1.1 or less. In the exemplary embodiments shown in FIGS. 6 and 8, the ratio of these average depths is approximately 1.

In the above-described embodiment, since the average depths of the first recess portion 64 and the second recess portion 68 formed in the shank 60 are substantially equal, the biasing of the load transmission between the first lateral surface 62 side (pressure surface 50 side) and the second lateral surface 66 side (suction surface 52 side) of the shank 60 can be suppressed. As a result, the stress on the pressure surface 50 side and the suction surface 52 side in the blade root portion 51 can be equalized, or the generation of bending stress due to the biasing of the load in the shank 60 can be suppressed. Therefore, the stress distribution in the blade root portion 51 can be effectively equalized, or the generation of stress in the shank 60 can be suppressed.

In some embodiments, for example, as shown in FIG. 7, the depth D1 of the first recess portion 64 and the depth D2 of the second recess portion may not be necessarily equal. That is, in some embodiments, the above-mentioned ratio of the first average depth to the second average depth may be less than 0.9 or larger than 1.1.

In some embodiments, for example, as shown in FIG. 8, the shank 60 may have a thickness decrease portion 80 or 82 in which the thickness of the shank 60 decreases toward the front end surface 70 or the rear end surface 72 on the front end surface 70 side or the rear end surface 72 side of the first recess portion 64 and the second recess portion 68. In the exemplary embodiment shown in FIG. 8, the shank 60 has a front-side thickness decrease portion 80 in which the thickness of the shank 60 decreases toward the front end surface 70 on the front end surface 70 side of the first recess portion 64 and the second recess portion 68. The shank 60 has a rear-side thickness decrease portion 82 in which the thickness of the shank 60 decreases toward the rear end surface 72 on the rear end surface 72 side of the first recess portion 64 and the second recess portion 68.

As shown in FIG. 4, in the vicinity of the front end surface 70 or the rear end surface 72 of the shank 60, there may be a region in which the airfoil portion 44 does not exist thereabove, and in this region, the load transmitted from the airfoil portion 44 is relatively small. In this regard, according to the above-described embodiment, the thickness decrease portion 80 or 82 in which the thickness decreases toward the front end surface 70 or the rear end surface 72 is provided on the front end surface 70 side or the rear end surface 72 side of the shank 60 in which the load transmitted from the airfoil portion 44 is relatively small. Thus, the cross-sectional area of the shank 60 can be reduced to reduce the load acting on the blade root portion 51 via the shank 60. Therefore, it is possible to reduce the stress generated in the blade root portion 51 and suppress the decrease in the fatigue life of the turbine blade 40.

In some embodiments, in the cross-section (that is, the cross-section orthogonal to the front-rear direction (turbine axial direction)) including the blade height direction and the width direction of the shank 60, a minimum thickness position 78 (see FIG. 5) of the shank defined by the first recess portion 64 and the second recess portion 68 is included in the range of 0.4H or more and 0.6H or less in the total height range of the shank 60 represented using the total height H of the shank 60.

The height of the shank 60 in the present specification is the length between a connection position $P_C$ between the shank 60 and the blade root portion 51 and a lower surface 43 of the platform 42 in the blade height direction. The connection position $P_C$ is defined as an intersection of a straight line La1 (or an approximate straight line) connecting the bottom points P1 to P3 of a plurality of teeth 55 of the blade root portion 51 and the surface of the blade root portion 51 or the shank 60 (see FIG. 5).

According to the above configuration, since the minimum thickness position 78 of the shank 60 is disposed in the central region of 0.4H or more and 0.6H or less in the total height range of the shank 60, it is possible to reduce the cross-sectional area of the shank 60 in the region including this position and gradually increase the cross-sectional area toward the blade root portion 51. As a result, the load transmission to the blade root portion 51 in the shank 60 is promoted, and the load sharing in the radially outer portion of the blade root portion 51 is increased, so that the load fraction in the radially inner portion of the blade root portion 51 can be made relatively small. Therefore, the stress distribution in the blade root portion 51 can be effectively equalized.

In some embodiments, for example, as shown in FIG. 5, the first recess portion 64 and the second recess portion 68 extend over the entire range of the shank 60 in the blade height direction. That is, the first recess portion 64 and the second recess portion 68 extend over the entire region between the above-mentioned connection position $P_C$ and the lower surface 43 of the platform 42 in the blade height direction.

According to the above-described embodiment, since the first recess portion 64 and the second recess portion 68 are provided so as to extend over the entire range in the blade height direction of the shank 60, the thickness of the central portion of the shank 60 can be effectively reduced. As a result, it is possible to effectively reduce the rigidity of the central portion of the shank 60, thereby distributing the load transmitted from the airfoil portion 44 to the shank 60 to the front end side and the rear end side. Therefore, the stress distribution in the blade root portion 51 can be effectively equalized.

In some embodiments, at least one of the first recess portion 64 or the second recess portion 68 has a fillet portion at the end in the blade height direction and is connected to the platform 42 or the blade root portion 51 via the fillet portion.

In the exemplary embodiment shown in FIG. 5, the first recess portion 64 is connected to the platform 42 via an outer fillet portion 58A at the radially outer end portion (the end portion on the platform 42 side) and is connected to the blade root portion 51 via an inner fillet portion 59A at the radially inner end portion (the end portion on the blade root portion 51 side). The second recess portion 68 is connected to the platform 42 via an outer fillet portion 58B at the radially outer end portion (the end portion on the platform 42 side), and is connected to the blade root portion 51 via an inner fillet portion 59B at the radially inner end portion (the end portion on the blade root portion 51 side).

According to the above-described embodiment, since at least one of the first recess portion 64 or the second recess portion 68 is smoothly connected to the platform 42 or the blade root portion 51 via the fillet portion (the outer fillet portion 58A or 58B or the inner fillet portion 59A or 59B), the stress concentration in the shank 60 can be effectively suppressed. Therefore, it is possible to suppress a decrease in the fatigue life of the turbine blade 40.

In some embodiments, the radius of curvature of the outer fillet portion 58A of the first recess portion 64 is smaller than the radius of curvature of the inner fillet portion 59A of the first recess portion 64.

In some embodiments, the radius of curvature of the outer fillet portion 58B of the second recess portion 68 is smaller than the radius of curvature of the inner fillet portion 59B of the second recess portion 68.

According to the above-described embodiment, the radius of curvature of the outer fillet portion 58A or 58B on the platform 42 side is smaller than the radius of curvature of the inner fillet portion 59A or 59B on the blade root portion 51 side. Thus, the cross-sectional area orthogonal to the blade height direction of the shank 60 narrows to a small size near the platform 42 in the blade height direction and gradually increases toward the blade root portion 51. As a result, the load transmission to the blade root portion 51 in the shank 60 is promoted, and the load sharing in the radially outer portion of the blade root portion 51 is increased, so that the load fraction in the radially inner portion of the blade root portion 51 can be made relatively small. Therefore, the stress distribution in the blade root portion 51 can be effectively equalized.

In some embodiments, for example, as shown in FIG. 4, the center position (the position of the straight line Lc2 in FIG. 4) in the width direction (or the front-rear direction (turbine axial direction)) of the shank 60 in the cross-section orthogonal to the extension direction of the blade root portion 51 is shifted to the suction surface 52 side from the center position of the platform 42 (the position of the straight line Lc1 in FIG. 4) in the width direction (or the front-rear direction (turbine axis direction)) of the shank 60.

In a typical turbine blade, the center of gravity of the platform and airfoil portion is aligned with the center position of the blade root portion. Considering that the platform is shifted to the pressure surface side with respect to the blade root portion and the shank while keeping the center of gravity on the blade root portion, in order to maintain the center of gravity on the blade root portion, the airfoil portion is shifted to the suction surface side with respect to the blade root portion. Therefore, in the case of a turbine blade in which the platform is provided so as to be shifted to the pressure surface side with respect to the shank, the airfoil portion is biased toward the suction surface side with respect to the shank. That is, the blade tends to ride on the suction surface side in the central region of the shank and tends to ride on the pressure surface side in a biased manner in the front-end-side region and the rear-end-side region of the shank. The turbine blade 40 according to the above-described embodiment has such characteristics. Therefore, the above-mentioned merit obtained by setting the formation length L1 of the first recess portion 64 on the pressure surface 50 side to be larger than the formation length L2 of the second recess portion 68 on the suction surface 52 side (for example, the merit such as being able to effectively reduce the thickness of the central portion of the shank 60) can be exhibited more effectively.

The contents described in each of the above embodiments are grasped as follows, for example.

(1) A turbine blade (40) according to at least one embodiment of the present invention including: a platform (42); an airfoil portion (44) extending from the platform in a blade height direction and having a pressure surface (50) and a suction surface (52) extending between a leading edge (46) and a trailing edge (48); a blade root portion (51) disposed on opposite side of the airfoil portion across the platform in the blade height direction and having a bearing surface (54); and a shank (60) disposed between the platform and the blade root portion, wherein the shank has: a first lateral surface (62) having a first recess portion (64) and disposed on a pressure surface side and along an extension direction of the blade root portion; and a second lateral surface (66) having a second recess portion (68) and disposed on a suction surface side and along the extension direction of the blade root portion, and wherein in a cross-section of the shank orthogonal to the blade height direction, the first recess portion and the second recess portion include a central position (position of the straight line Lc3) of the shank in the extension direction of the blade root portion, and a formation length (L1) of the first recess portion along the extension direction of the blade root portion is larger than a formation length (L2) of the second recess portion along the extension direction of the blade root portion.

In general, the airfoil portion has a curved concave shape on the pressure surface and a curved convex shape on the suction surface. Thus, in the central region of the shank in the extension direction (or the front-rear direction) of the blade root portion, the camber of the airfoil portion above the shank is biased toward the second lateral surface rather than the first lateral surface of the shank. In this regard, in the embodiment of (1), in the central region of the shank, the second recess portion on the second lateral surface side (the suction surface side) where the airfoil portion is mainly disposed thereabove (that is, on the radially outer side of the turbine) and the load transmission from the airfoil portion is relatively large is formed relatively short. In contrast, the first recess portion on the first lateral surface side (the pressure surface side) where the airfoil portion is not mainly disposed thereabove and the load transmission from the airfoil portion is relatively small is formed relatively long. Therefore, the thickness of the central portion of the shank can be effectively reduced, whereby the rigidity of the central portion of the shank can be effectively reduced and the load transmitted from the airfoil portion to the shank can be distributed to the front end side and the rear end side. Therefore, it is possible to effectively equalize the stress distribution in the blade root portion and suppress a decrease in the fatigue life of the turbine blade.

(2) In some embodiments, in the configuration of (1), when a total length of the shank in the extension direction is L on the cross-section of the shank, the first recess portion and the second recess portion are provided in a central region (the region R3) of the shank excluding end regions (the regions R1 and R2) having a length of L/6 at both ends of the shank.

According to the configuration of (2), since the first recess portion and the second recess portion are provided in the central region excluding the end regions of the shank, the thickness of the central portion of the shank can be effectively reduced. Therefore, the rigidity of the central portion of the shank can be effectively reduced, the load transmitted from the airfoil portion to the shank can be distributed to the front end side and the rear end side, and the stress distribution in the blade root portion can be effectively equalized.

(3) In some embodiments, in the configuration of (1) or (2), when the total length of the shank in the extension direction is L on the cross-section of the shank, the formation length of the first recess portion in the extension direction is larger than L/3 and 2L/3 or less, the formation length of the second recess portion in the extension direction is L/3 or more and less than 2L/3.

In the configuration of (3), the length of the first recess portion is larger than L/3 and the length of the second recess portion is or more, so that the thickness of the central portion of the shank can be effectively reduced. Since the length of the first recess portion is 2L/3 or less and the length of the second recess portion is less than 2L/3, the shank can be provided with appropriate strength. Therefore, according to the configuration of (3), it is possible to effectively reduce the thickness of the central portion of the shank while providing the shank with appropriate strength. Therefore, the rigidity of the central portion of the shank can be effectively reduced, the load transmitted from the airfoil portion to the shank can be distributed to the front end side and the rear end side, and the stress distribution in the blade root portion can be effectively equalized.

(4) In some embodiments, in the configuration of any one of (1) to (3), on the cross-section of the shank, a ratio of a first average depth which is an average depth of the first recess portion in a width direction of the shank and a second average depth which is an average depth of the second recess portion in the width direction is 0.9 or more and 1.1 or less.

According to the configuration of (4), since the average depths of the first recess portion and the second recess portion formed in the shank are substantially equal, the biasing of the load transmission between the first lateral surface side (pressure surface side) and the second lateral surface side (suction surface side) of the shank can be suppressed. As a result, the stress on the pressure surface side and the suction surface side in the blade root portion can be equalized, or the generation of bending stress due to the biasing of the load in the shank can be suppressed. Therefore, the stress distribution in the blade root portion can be effectively equalized, or the generation of stress in the shank can be suppressed.

(5) In some embodiments, in the configuration of any one of (1) to (4), the shank has a front end surface (70) and a rear end surface (72) which are both end surfaces in the extension direction, and on the cross-section of the shank, the shank has a thickness decrease portion in which a thickness of the shank decreases toward a front end surface or a rear end surface on a front end surface side or a rear end surface side of the first recess portion and the second recess portion.

In the vicinity of the front end surface or the rear end surface of the shank, there may be a region in which the airfoil portion does not exist thereabove, and in this region, the load transmitted from the airfoil portion is relatively small. According to the configuration of (5), the thickness decrease portion in which the thickness decreases toward the front end surface or the rear end surface is provided on the front end surface side or the rear end surface side of the shank in which the load transmitted from the airfoil portion is relatively small. Thus, the cross-sectional area of the shank can be reduced to reduce the load acting on the blade root portion via the shank. Therefore, it is possible to reduce the stress generated in the blade root portion and suppress the decrease in the fatigue life of the turbine blade.

(6) In some embodiments, in the configuration of any one of (1) to (5), in the cross-section including the blade height direction and a width direction of the shank, a minimum thickness position (78) of the shank defined by the first recess portion and the second recess portion is included in a range of 0.4H or more and 0.6H or less in a total height range of the shank represented using a total height H of the shank.

According to the configuration of (6), since the minimum thickness position of the shank is disposed in the central region of 0.4H or more and 0.6H or less in the total height range of the shank, it is possible to reduce the cross-sectional area of the shank in the region including this position and gradually increase the cross-sectional area toward the blade root portion. As a result, the load transmission to the blade root portion in the shank is promoted, and the load sharing in the radially outer portion of the blade root portion is increased, so that the load fraction in the radially inner portion of the blade root portion can be made relatively small. Therefore, the stress distribution in the blade root portion can be effectively equalized.

(7) In some embodiments, in the configuration of any one of (1) to (6), the first recess portion and the second recess portion extend over an entire range of the shank in the blade height direction.

According to the configuration of (7), since the first recess portion and the second recess portion are provided so as to extend over the entire range in the blade height direction of the shank, the thickness of the central portion of the shank can be effectively reduced. As a result, it is possible to effectively reduce the rigidity of the central portion of the shank, thereby distributing the load transmitted from the airfoil portion to the shank to the front end side and the rear end side. Therefore, the stress distribution in the blade root portion can be effectively equalized.

(8) In some embodiments, in the configuration of any one of (1) to (7), at least one of the first recess portion or the second recess portion has a fillet portion (for example, the outer fillet portions 58A and 58B or the inner fillet portions 59A and 59B) at an end in the blade height direction and is connected to the platform or the blade root portion via the fillet portion.

According to the configuration of (8), since at least one of the first recess portion or the second recess portion is smoothly connected to the platform or the blade root portion via the fillet portion, the stress concentration in the shank can be effectively suppressed. Therefore, it is possible to suppress a decrease in the fatigue life of the turbine blade.

(9) In some embodiments, in the configuration of any one of (1) to (8), at least one of the first recess portion or the second recess portion is connected to the platform via an outer fillet portion (58A, 58B) and is connected to the blade root portion via the inner fillet portion (59A, 59B), and a radius of curvature of the outer fillet portion is smaller than a radius of curvature of the inner fillet portion.

According to the configuration of (9), the radius of curvature of the outer fillet portion on the platform side is smaller than the radius of curvature of the inner fillet portion on the blade root portion side. Thus, the cross-sectional area of the shank narrows to a small size near the platform in the blade height direction and gradually increases toward the blade root portion. As a result, the load transmission to the blade root portion in the shank is promoted, and the load sharing in the radially outer portion of the blade root portion is increased, so that the load fraction in the radially inner portion of the blade root portion can be made relatively small. Therefore, the stress distribution in the blade root portion can be effectively equalized.

(10) In some embodiments, in the configuration of any one of (1) to (9), in the cross-section orthogonal to the extension direction of the blade root portion, a center position (the position of the straight line Lc2) in the width direction of the shank is shifted to the suction surface side from the center position (the position of the straight line Lc1) in the width direction of the platform.

In a typical turbine blade, the center of gravity of the platform and airfoil portion is aligned with the center position of the blade root portion, Considering that the platform is shifted to the pressure surface side with respect to the blade root portion and the shank while keeping the center of gravity on the blade root portion, in order to maintain the center of gravity on the blade root portion, the airfoil portion is shifted to the suction surface side with respect to the blade root portion. Therefore, in the case of a turbine blade in which the platform is provided so as to be shifted to the pressure surface side with respect to the shank, the airfoil portion is biased toward the suction surface side with respect to the shank. That is, the blade tends to ride on the suction surface side in the central region of the shank and tends to ride on the pressure surface side in a biased manner in the front-end-side region and the rear-end-side region of the shank. The turbine blade according to the configuration of (10) has such characteristics. Therefore, the above-mentioned merit obtained by setting the formation length of the first recess portion on the pressure surface side to be larger than the formation length of the second recess portion on the suction surface side (for example, the merit such as being able to effectively reduce the thickness of the central portion of the shank) can be exhibited more effectively.

(11) In some embodiments, in the configuration of any one of (1) to (10), the shank has a front end surface and a rear end surface which are both end surfaces in the extension direction, on the cross-section of the shank, the first lateral surface includes a first front contour (63*a*) connected to the front end surface, a first rear contour (63*b*) connected to the rear end surface, and a first recess contour (63*c*) that is disposed between the first front contour and the first rear contour and forms the first recess portion, on the cross-section of the shank, the second lateral surface includes a second front contour (67*a*) connected to the front end surface, a second rear contour (67*b*) connected to the rear end surface, and a second recess contour (67*c*) that is disposed between the second front contour and the second rear contour and forms the second recess portion, each of the first front contour and the first rear contour overlaps with a linear first reference contour (74) extending along the extension direction of the blade root portion in at least one region including a connection point ($P_{A1}$ and $P_{A2}$) with the first recess contour, the first recess contour is disposed on an inner side from the pressure surface side with respect to the first reference contour, each of the second front contour and the second rear contour overlaps with a linear second reference contour (76) extending along the extension direction of the blade root portion in at least one region including a connection point ($P_{B1}$ and $P_{B2}$) with the second recess contour, and the second recess contour is disposed on an inner side from the suction surface side with respect to the second reference contour.

According to the configuration of (11), the first recess portion is formed by the first recess contour disposed on the inner side of the linear first reference contour, and the second recess portion is formed by the second recess contour disposed on the inner side of the linear second reference contour. Therefore, the thickness of the central portion of the shank can be effectively reduced, the rigidity of the central portion of the shank can be effectively reduced, and the load transmitted from the airfoil portion to the shank can be distributed to the front end side and the rear end side. Therefore, it is possible to effectively equalize the stress distribution in the blade root portion and suppress a decrease in the fatigue life of the turbine blade.

(12) A turbine (for example, the turbine 6 or the gas turbine 1) according to at least one embodiment of the present invention including: the turbine blade according to any one of (1) to (11); and a rotor disk (32) having a blade groove that engages with the blade root portion of the turbine blade.

In the embodiment (12), in the central region of the shank, the second recess portion on the second lateral surface side (the suction surface side) where the airfoil portion is mainly disposed thereabove (that is, on the radially outer side of the turbine) and the load transmission from the airfoil portion is relatively large is formed relatively short. In contrast, the first recess portion on the first lateral surface side (the pressure surface side) where the airfoil portion is not mainly disposed thereabove and the load transmission from the airfoil portion is relatively small is formed relatively long. Therefore, the thickness of the central portion of the shank can be effectively reduced, whereby the rigidity of the central portion of the shank can be effectively reduced and the load transmitted from the airfoil portion to the shank can be distributed to the front end side and the rear end side. Therefore, it is possible to effectively equalize the stress distribution in the blade root portion and suppress a decrease in the fatigue life of the turbine blade.

Although the embodiment of the present invention has been described above, the present invention is not limited to the above-described embodiment, and includes a modification of the above-mentioned embodiment and a combination of these embodiments as appropriate.

In the present specification, an expression of relative or absolute arrangement such as “in a direction”, “along a direction”, “parallel”, “orthogonal”, “centered”, “concentric” and “coaxial” shall not be construed as indicating only the arrangement in a strict literal sense, but also includes a state where the arrangement is relatively displaced by a tolerance, or by an angle or a distance whereby it is possible to achieve the same function.

For example, an expression of an equal state such as “same”, “equal” and “uniform” shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression such as "comprise", "include", "have", "contain" and "constitute" are not intended to be exclusive of other components.

REFERENCE SIGNS LIST

1 Gas turbine
2 Compressor
4 Combustor
6 Turbine
8 Rotor
10 Compressor casing
12 Air intake port
16 Stator blade
18 Rotor blade
20 Casing
22 Turbine casing
24 Stator blade
26 Rotor blade
28 Combustion gas passage
30 Exhaust chamber
32 Rotor disk
33 Blade groove
34 Hollow portion
40 Turbine blade
42 Platform
43 Lower surface
44 Airfoil portion
46 Leading edge
48 Trailing edge
50 Pressure surface
51 Blade root portion
52 Suction surface
54 Bearing surface
55 Tooth
58A Outer fillet portion
58B Outer fillet portion
59A Inner fillet portion
59B Inner fillet portion
60 Shank
62 First lateral surface
63*a* First front contour
63*b* First rear contour
63*c* First recess contour
64 First recess portion
66 Second lateral surface
67*a* Second front contour
67*b* Second rear contour
67*c* Second recess contour
68 Second recess portion
70 Front end surface
72 Rear end surface
74 First reference contour
76 Second reference contour
78 Minimum thickness position
80 Thickness decrease portion
82 Thickness decrease portion
C Rotor axis
Lc1 Center line
Lc2 Center line
Lcam Camber line
P1 to P3 Bottom point
$P_{A1}$ Connection point
$P_{A2}$ Connection point
$P_{B1}$ Connection point
$P_{B2}$ Connection point

The invention claimed is:

1. A turbine blade, comprising:
a platform;
an airfoil portion extending from the platform in a blade height direction and having a pressure surface and a suction surface extending between a leading edge and a trailing edge;
a blade root portion disposed on opposite side of the airfoil portion across the platform in the blade height direction and having a bearing surface; and
a shank disposed between the platform and the blade root portion,
wherein the shank has:
a first lateral surface having a first recess portion and disposed on a pressure surface side and along an extension direction of the blade root portion; and
a second lateral surface having a second recess portion and disposed on a suction surface side and along the extension direction of the blade root portion,
wherein in a cross-section of the shank orthogonal to the blade height direction,
the first recess portion and the second recess portion include a central position of the shank in the extension direction of the blade root portion, and
a formation length of the first recess portion along the extension direction of the blade root portion is larger than a formation length of the second recess portion along the extension direction of the blade root portion.

2. The turbine blade according to claim 1, wherein
when a total length of the shank in the extension direction is L on the cross-section of the shank, the first recess portion and the second recess portion are provided in a central region of the shank excluding end regions having a length of L/6 at both ends of the shank.

3. The turbine blade according to claim 1, wherein
when a total length of the shank in the extension direction is L on the cross-section of the shank,
the formation length of the first recess portion in the extension direction is larger than L/3 and 2L/3 or less,
the formation length of the second recess portion in the extension direction is L/3 or more and less than 2L/3.

4. The turbine blade according to claim 1, wherein
on the cross-section of the shank, a ratio of a first average depth which is an average depth of the first recess portion in a width direction of the shank and a second average depth which is an average depth of the second recess portion in the width direction is 0.9 or more and 1.1 or less.

5. The turbine blade according to claim 1, wherein
the shank has a front end surface and a rear end surface which are both end surfaces in the extension direction, and
on the cross-section of the shank, the shank has a thickness decrease portion in which a thickness of the shank decreases toward the front end surface or the rear end surface on a front end surface side or a rear end surface side of the first recess portion and the second recess portion.

6. The turbine blade according to claim 1, wherein
in the cross-section including the blade height direction and a width direction of the shank, a minimum thickness position of the shank defined by the first recess portion and the second recess portion is included in a range of 0.4H or more and 0.6H or less in a total height range of the shank represented using a total height H of the shank.

7. The turbine blade according to claim 1, wherein the first recess portion and the second recess portion extend over an entire range of the shank in the blade height direction.

8. The turbine blade according to claim 1, wherein at least one of the first recess portion or the second recess portion has a fillet portion at an end in the blade height direction, and is connected to the platform or the blade root portion via the fillet portion.

9. The turbine blade according to claim 1, wherein at least one of the first recess portion or the second recess portion is connected to the platform via an outer fillet portion and is connected to the blade root portion via an inner fillet portion, and a radius of curvature of the outer fillet portion is smaller than a radius of curvature of the inner fillet portion.

10. The turbine blade according to claim 1, wherein in the cross-section orthogonal to the extension direction of the blade root portion, a center position in a width direction of the shank is shifted to the suction surface side from the center position in the width direction of the platform.

11. The turbine blade according to claim 1, wherein the shank has a front end surface and a rear end surface which are both end surfaces in the extension direction, on the cross-section of the shank, the first lateral surface includes a first front contour connected to the front end surface, a first rear contour connected to the rear end surface, and a first recess contour that is disposed between the first front contour and the first rear contour and forms the first recess portion, on the cross-section of the shank, the second lateral surface includes a second front contour connected to the front end surface, a second rear contour connected to the rear end surface, and a second recess contour that is disposed between the second front contour and the second rear contour and forms the second recess portion, each of the first front contour and the first rear contour overlaps with a linear first reference contour extending along the extension direction of the blade root portion in at least one region including a connection point with the first recess contour, the first recess contour is disposed on an inner side from the pressure surface side with respect to the first reference contour, each of the second front contour and the second rear contour overlaps with a linear second reference contour extending along the extension direction of the blade root portion in at least one region including a connection point with the second recess contour, and the second recess contour is disposed on an inner side from the suction surface side with respect to the second reference contour.

12. A turbine comprising:

the turbine blade according to claim 1; and a rotor disk having a blade groove that engages with the blade root portion of the turbine blade.

* * * * *